US00RE48291E

(19) United States
(12) Reissued Patent
Yi et al.

(10) Patent Number: US RE48,291 E
(45) Date of Reissued Patent: *Oct. 27, 2020

(54) METHOD OF DELIVERING A PDCP DATA UNIT TO AN UPPER LAYER

(71) Applicant: LG Electronics Inc., Seoul (KR)

(72) Inventors: Seung-June Yi, Anyang (KR); Sung-Jun Park, Anyang (KR); Young-Dae Lee, Anyang (KR); Sung-Duck Chun, Anyang (KR)

(73) Assignee: LG Electronics Inc., Seoul (KR)

( * ) Notice: This patent is subject to a terminal disclaimer.

(21) Appl. No.: 14/877,323

(22) Filed: Oct. 7, 2015

Related U.S. Patent Documents

Reissue of:
(64) Patent No.: 8,553,566
Issued: Oct. 8, 2013
Appl. No.: 13/572,391
Filed: Aug. 10, 2012

U.S. Applications:
(63) Continuation of application No. 12/457,764, filed on Jun. 19, 2009, now Pat. No. 8,274,900.
(Continued)

(30) Foreign Application Priority Data

Jun. 8, 2009 (KR) ..... 10-2009-0050624
Jun. 12, 2009 (GB) ..... 0910196.5

(51) Int. Cl.
*H04L 1/00* (2006.01)
*H04L 1/18* (2006.01)

(52) U.S. Cl.
CPC ..... *H04L 1/1829* (2013.01)

(58) Field of Classification Search
CPC ..... H04L 1/1829
(Continued)

(56) References Cited

U.S. PATENT DOCUMENTS 6,687,248 B2 * 2/2004 Jiang ..... H04W 28/06 370/328
7,009,951 B2 * 3/2006 Kalliokulju ..... H04L 69/324 370/331
(Continued)

FOREIGN PATENT DOCUMENTS

CN 1620768 5/2005
CN 1968493 A 5/2007
(Continued)

OTHER PUBLICATIONS

Ericsson, Nokia Corperation, Nokia Siemens Networks, "Sequence Number Handling at PDCP", 3GPP TSG-RAN WG2, R2-081341 Meeting #61, Feb. 15, 2008.*
(Continued)

*Primary Examiner* — David E England
(74) *Attorney, Agent, or Firm* — Dentons US LLP

(57) ABSTRACT

Disclosed is a radio (wireless) communication system providing a radio communication service and a terminal, and more particularly, to a method of delivering a continuously and/or consecutively received Packet Data Convergence Protocol (PDCP) Service Data units (SDUs) to an upper layer immediately if a PDCP entity receives the PDCP SDUs during a process of a RLC re-establishment within an Evolved Universal Mobile Telecommunications System (E-UMTS) that has evolved from a Universal Mobile Telecommunications System (UMTS) or a Long Term Evolution (LTE) system.

14 Claims, 9 Drawing Sheets

Related U.S. Application Data

(60) Provisional application No. 61/074,233, filed on Jun. 20, 2008, provisional application No. 61/074,998, filed on Jun. 23, 2008.

(58) Field of Classification Search
USPC ..... 370/310, 242
See application file for complete search history.

(56) References Cited

U.S. PATENT DOCUMENTS 7,167,475 B2 * 1/2007 Tourunen ..... H04L 1/1657 370/328
7,203,196 B2 * 4/2007 Jiang ..... H04L 1/1664 370/394
7,266,105 B2 * 9/2007 Wu ..... H04L 47/10 370/338
7,616,639 B2 * 11/2009 Lee ..... H04L 1/1664 370/394
7,706,537 B2 * 4/2010 Yi ..... H04L 63/0457 380/262
7,817,669 B2 * 10/2010 Pani ..... H04L 1/0007 370/474
7,821,975 B2 * 10/2010 Burbidge ..... H04W 76/028 370/310
7,889,867 B2 * 2/2011 Yi ..... H04L 63/0457 380/262
8,054,836 B2 * 11/2011 Fischer ..... H04W 36/02 370/394
8,180,299 B2 * 5/2012 Chun ..... H04L 1/1607 455/67.11
8,208,402 B2 * 6/2012 Fischer ..... H04W 8/245 370/254
8,208,474 B2 * 6/2012 Kim ..... H04L 1/165 370/394
8,335,189 B2 * 12/2012 Wang ..... H04W 12/02 370/331
8,355,331 B2 * 1/2013 Chun ..... H04W 28/06 370/242
8,483,109 B2 * 7/2013 Burbidge ..... H04W 76/028 370/310
8,514,708 B2 * 8/2013 Yi ..... H04L 1/1877 370/232
8,553,566 B2 * 10/2013 Yi ..... H04L 1/1829 370/242
8,588,175 B2 * 11/2013 Kim ..... H04L 1/1841 370/328
8,711,834 B2 * 4/2014 Sharma ..... H04L 1/1896 370/350
9,167,564 B2 * 10/2015 Somasundaram .... H04L 1/1838
9,191,810 B2 * 11/2015 Kuo ..... H04L 63/20
9,843,925 B2 * 12/2017 Wang ..... H04W 12/02
10,135,610 B2 * 11/2018 Sammour ..... H04W 80/02
2002/0141414 A1 * 10/2002 Rezaiifar et al. ..... 370/394
2003/0054807 A1 * 3/2003 Hsu et al. ..... 455/414
2003/0137931 A1 * 7/2003 Hans ..... H04L 29/06 370/216
2003/0177437 A1 * 9/2003 Wu ..... H04L 1/1867 714/776
2003/0206534 A1 11/2003 Wu ..... H04W 28/06 370/328
2003/0210714 A1 * 11/2003 Wu ..... H04W 28/06 370/503
2004/0042491 A1 * 3/2004 Sarkkinen ..... H04L 1/1642 370/469
2004/0147236 A1 * 7/2004 Parkvall ..... H04L 41/06 455/560
2004/0153852 A1 * 8/2004 Wu ..... H04L 1/1838 714/43
2005/0074024 A1 * 4/2005 Kim ..... H04L 12/18 370/432
2005/0100048 A1 5/2005 Chun et al.
2005/0213540 A1 9/2005 Matsumoto
2006/0050679 A1 * 3/2006 Jiang ..... H04L 7/041 370/350
2006/0256794 A1 * 11/2006 Rezaiifar et al. ..... 370/394
2006/0281413 A1 * 12/2006 Burbidge ..... H04W 76/028 455/67.11
2007/0110101 A1 * 5/2007 Wu ..... H04L 1/1874 370/469
2007/0133456 A1 * 6/2007 Ding ..... H04W 72/005 370/328
2007/0268932 A1 * 11/2007 Lee ..... H04L 1/1685 370/469
2007/0291788 A1 * 12/2007 Sammour ..... H04W 28/06 370/466
2008/0080516 A1 * 4/2008 Sammour ..... H04L 1/165 370/394
2008/0137574 A1 * 6/2008 Jiang ..... H04L 1/1841 370/310
2008/0148136 A1 6/2008 Bae et al. ..... H04L 1/1874 714/799
2008/0310367 A1 * 12/2008 Meylan ..... H04W 36/02 370/331
2009/0016301 A1 * 1/2009 Sammour ..... H04L 49/90 370/331
2009/0046626 A1 * 2/2009 Shao ..... H04L 47/10 370/320
2009/0104890 A1 * 4/2009 Wang et al. ..... H04W 12/02 455/410
2009/0168723 A1 * 7/2009 Meylan ..... H04L 1/1841 370/331
2009/0175163 A1 * 7/2009 Sammour et al. .... H04L 1/1685 370/216
2009/0185535 A1 * 7/2009 Lee et al. ..... H04W 36/02 370/331
2009/0257399 A1 * 10/2009 Kuo ..... 370/331
2009/0290598 A1 * 11/2009 Pani et al. ..... 370/473
2010/0061243 A1 * 3/2010 Yi ..... H04L 1/1841 370/235
2011/0093754 A1 * 4/2011 Chun et al. ..... 714/748
2012/0182971 A1 * 7/2012 Ohta et al. ..... 370/331
2012/0195289 A1 * 8/2012 Ohta ..... 370/331
2012/0218972 A1 * 8/2012 Ohta ..... 370/331
2017/0367017 A9 * 12/2017 Meylan ..... H04W 36/023

FOREIGN PATENT DOCUMENTS

EP 1326388 A2 7/2003
EP 1 343 267 9/2003
EP 2 015 526 1/2009
EP 2129053 A1 * 12/2009 ..... H04W 36/02
EP 2141937 A1 * 1/2010 ..... H04Q 7/38
GB 2462699 A * 2/2010 ..... H04L 69/26
GB 2462699 B * 10/2010 ..... H04L 69/26
JP 2007-533280 11/2007
JP 2010-512125 4/2010
WO WO 2007/126192 11/2007
WO 2008048072 A1 4/2008
WO WO 2008/070668 6/2008
WO WO 2008/097486 8/2008
WO WO 2009/018318 2/2009

OTHER PUBLICATIONS

Motorola, "RLC Reset vs. Re-establishment—a slightly different perspective", 3GPP TSG-RAN WG2#61, R2-081121, Feb. 15, 2008.*
Motorola, "PDCP Handover Handling," 3GPP TSG-RAN WG2 Meeting #61, R2-081809, Mar. 31, 2008.*
3GPP, 3GPP TS 36.323 V8.2.1, May 2008, 3GPP, V8.2.1.*
LG Electronics, 3GPP TSG-RAN2 Meeting #62 R2-082882, May 5-9, 3GPP, Meeting #62 R2-082882.*
Ericsson, 3GPP TSG-RAN2 Meeting #62 R2-082101, May 5-9, 3GPP, Meeting #62 R2-082101.*
LG Electronics, 3GPP TSG-RAN2 Meeting #62 R2-082853, May 5-9, 3GPP, Meeting #62 R2-082853.*
Ericsson, 3GPP TSG-RAN2 Meeting #62 R2-082854, May 5-9, 3GPP, Meeting #62 R2-082854.*

(56) References Cited

OTHER PUBLICATIONS

Motorola, 3GPP TSG-RAN2 Meeting #62 R2-082857, May 5-9, 3GPP, Meeting #62 R2-082857.*
3GPP, 3GPP Specification Change Request records for: 36.323, Jan. 30, 2020, 36.323.*
Alcatel-Lucent, Nokia Corp., Nokia Siemens Network, LG Electronics Inc., Qualcomm Europe, 3GPP TSG-RAN Meeting #40 RP-080387, May 28-30, 3GPP, Meeting #40 RP-080387.*
3GPP, TSG-Ran Meeting #40 RP-080412, May 27-30, 3GPP, Meeting #40 RP-080412.*
LG Electronics: "Reordering at handover", 3GPP TSG RAN WG2#61, R2-080968, Feb. 11-15, 2008.
LG Electronics Inc.:"Delivery of PDCP SDUs received in-sequence," Change Request 36.323, 3GPP TSG-RAN2 Meeting #62bis, R2-083367, Jun. 30-Jul. 4, 2008.
Motorola, "PDCP Handover Handling," 3GPP TSG-RAN WG2 Meeting #61, Mar. 31-Apr. 4, 2008, R2-081809.

* cited by examiner

METHOD OF DELIVERING A PDCP DATA UNIT TO AN UPPER LAYER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE

The present application claims priority benefit to the following applications, which contents are all incorporated by reference for all purposes as if fully set forth herein: This Application *is a reissue of application Ser. No. 13/572,391, filed on Aug. 10, 2012 now U.S. Pat. No. 8,553,566 B2, which* is a Continuation of U.S. application Ser. No. 12/457,764, filed Jun. 19, 2009 now U.S. Pat. No. 8,274,900, which claims the benefit of U.S. Provisional Application Nos. 61/074,233, filed Jun. 20, 2008, 61/074,998, filed Jun. 23, 2008, Korean Application No. 10-2009-0050624, filed Jun. 8, 2009, and United Kingdom Patent Application No. 0910196.5 filed Jun. 12, 2009.

TECHNICAL FIELD

The present invention relates to a radio (wireless) communication system providing a radio communication service and a terminal, and more particularly, to a method of delivering a Packet Data Convergence Protocol (PDCP) Service Data unit (SDU) to an upper layer within a receiving side entity of an Evolved Universal Mobile Telecommunications System (E-UMTS) that has evolved from a Universal Mobile Telecommunications System (UMTS) or a Long Term Evolution (LTE) system.

BACKGROUND ART

FIG. 1 shows an exemplary network structure of a Long-Term Evolution (LTE) system as a mobile communication system to which a related art and the present invention are applied. The LTE system is a system that has evolved from the existing UMTS system, and its standardization work is currently being performed by the 3GPP standards organization.

The LTE network can roughly be divided into an Evolved UMTS Terrestrial Radio Access Network (E-UTRAN) and a Core Network (CN). The E-UTRAN is generally comprised of a terminal (i.e., User Equipment (UE)), a base station (i.e., Evolved Node B (eNode B)), an access gateway (aGW) that is located at an end of the network and connects with one or more external networks. The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the aGW and a node or the like for user registration of the UE. An interface for discriminating the E-UTRAN and the CN may be used.

FIGS. 2 and 3 show respective exemplary structures of a radio interface protocol between the terminal and the E-UTRAN based on the 3GPP radio access network standards. The radio interface protocol has horizontal layers comprising a physical layer, a data link layer, and a network layer, and has vertical planes comprising a user plane (U-plane) for transmitting user data information and a control plane (C-plane) for transmitting control signaling. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane in FIG. 2 and those of the radio protocol user plane in FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common transport channel according to whether or not a channel is shared. Between different physical layers, namely, between a physical layer of a transmitting side and that of a receiving side, data is transmitted via the physical channel using radio resources.

The second layer includes various layers. First, a medium access control (MAC) layer performs mapping various logical channels to various transport channels and performs logical channel multiplexing by mapping several logical channels to a single transport channel. The MAC layer is connected to an upper layer called a radio link control (RLC) layer by a logical channel. The logical channel is roughly divided into a control channel that transmits information of the control plane and a traffic channel that transmits information of the user plane according to a type of transmitted information.

A Radio Link Control (RLC) layer of the second layer segments and/or concatenates data received from an upper layer to adjust the data size so as for a lower layer to suitably transmit the data to a radio interface. In addition, in order to guarantee various Quality of Services (QoSs) required by each radio bearer (RB), the RLC layer provides three operational modes: a Transparent Mode (TM); an Unacknowledged Mode (UM); and an Acknowledged Mode (AM). In particular, the AM RLC performs a retransmission function through an Automatic Repeat and Request (ARQ) for a reliable data transmission.

A Packet Data Convergence Protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases transmission efficiency between radio interfaces by allowing the header part of the data to transmit only the essential information. In addition, the PDCP layer performs a security function in the LTE system. The security function includes ciphering for preventing data wiretapping by a third party, and integrity protection for preventing data manipulation by a third party.

The Radio Resource Control (RRC) layer located at the lowermost portion of the third layer is defined only in the control plane, and controls a logical channel, a transport channel and a physical channel in relation to the configuration, reconfiguration, and release of radio bearers (RBs). In this case, the RBs refer to a logical path provided by the first and second layers of the radio protocol for data transmission between the UE and the UTRAN. In general, configuration (establishment, setup) of the RB refers to the process of stipulating the characteristics of a radio protocol layer and a channel required for providing a particular data service, and setting the respective detailed parameters and operational methods. The RBs include two types: a Signaling RB (SRB) and a Data RB (DRB). The SRB is used as a path for transmitting an RRC message on a C-plane, and the DRB is used as a path for transmitting user data on a U-plane.

In the related art, for a PDCP SDUs received through a RLC (Radio Link Control) re-establishment, a PDCP entity of a receiving side performs a reordering process after storing the PDCP SDU in a buffer without delivering the received PDCP SDUs to an upper layer. Those stored PDCP SDUs in the buffer are only delivered to the upper layer upon a comparison result of its sequence numbers (SN) with sequence numbers of new PDCP SDUs that are received after the RLC re-establishment.

In related art, a retransmission of PDCP SDUs by the PDCP entity in transmitting side is based on a RLC status report rather than the RLC re-establishment. As such, in often cases, the PDCP may receive all missing PDCP SDUs through exceed number of the RLC re-establishment. For example, if a plurality of handovers is occurred in a limited time period, a possibility for reception of the all missing PDCP SDUs is very high, as the plurality of handovers causes a plurality of RLC re-establishments. However, repeatedly re-transmitting the missing PDCP SDUs during the plurality of RLC re-establishments may cause an unnecessary time delay or a waste of radio resources.

Also, as explained above, those PDCP SDUs received through the RLC re-establishment are not delivered to the upper layer immediately. Rather, a reordering process is performed for those PDCP SDUs after storing them in the buffer. This may cause an unnecessary time delay as well. In addition, a deadlock situation may happen in case that a PDCP SDU received through the RLC re-establishment is a last packet of a data stream. For example, if the PCDP SDU is the last packet of the data stream, since there are no more data to be received through the RLC re-establishment, such PDCP SDU is continuously kept in the buffer instead of delivering to the upper layer.

Therefore, there is a need to have a solution for the aforementioned drawbacks of the related art.

DISCLOSURE OF THE INVENTION

Therefore, an object of the present invention is to minimize a time delay of data transmission, to prevent a waste of radio resources during the data transmission, and/or to prevent a deadlock situation during a delivery of PDCP SDUs to an upper layer.

For this, the present invention proposes to deliver a continuously and/or consecutively received PDCP SDUs to the upper layer immediately if a PDCP entity receives the PDCP SDUs from a RLC entity through a RLC re-establishment.

To achieve this and other advantages and in accordance with the purpose of the present invention, as embodied and broadly described herein, there is provided a data communication method in a wireless communication system, the method comprising: receiving a data unit having a sequence number from a lower layer; storing the received data unit in a buffer; determining whether the sequence number of the received data unit is equal to a sequence number+1 from a sequence number of a last delivered data unit; and delivering all stored data units with consecutively associated sequence numbers greater than or equal to the sequence number of the received data unit in ascending order of the associated sequence number based on the determining step.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

As described above, the present invention aims to minimize a time delay of data transmission, to prevent a waste of radio resources during the data transmission, and/or to prevent a deadlock situation during a delivery of PDCP SDUs to an upper layer.

To this end, the present invention proposes to deliver a continuously and/or consecutively received PDCP SDUs to the upper layer immediately if a PDCP entity receives the PDCP SDUs from a RLC entity by a RLC re-establishment.

Figure 1:
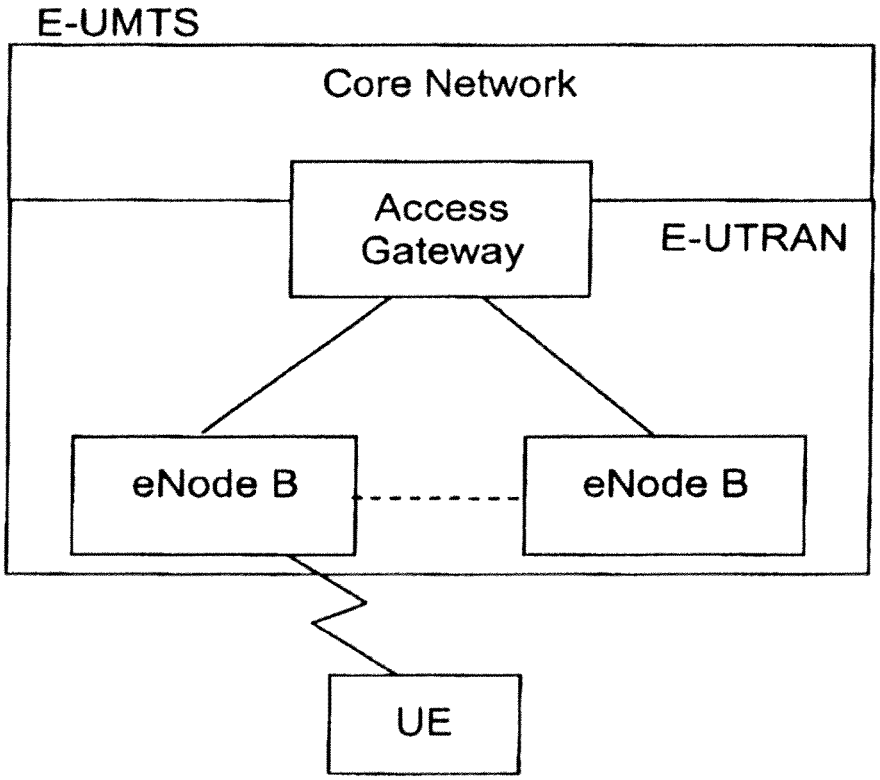
FIG. 1 PRIOR ART
FIG. 1 shows an exemplary network structure of an Evolved Universal Terrestrial Radio Access Network (E-UTRAN) as a mobile communication system to which a related art and the present invention are applied.
Figure 2:
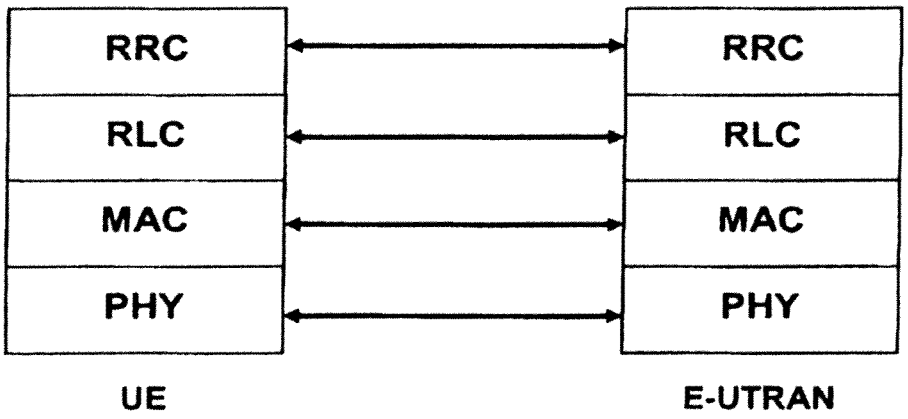
FIG. 2 PRIOR ART
FIG. 2 is an exemplary view of related art control plane architecture of a radio interface protocol between a terminal and an E-UTRAN.
Figure 3:
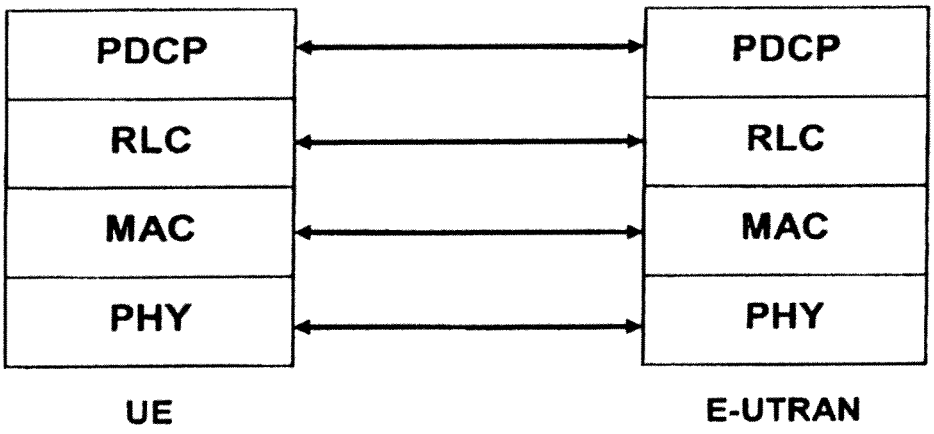
FIG. 3 PRIOR ART
FIG. 3 is an exemplary view of related art user plane architecture of a radio interface protocol between a terminal and an E-UTRAN.
Figure 4:
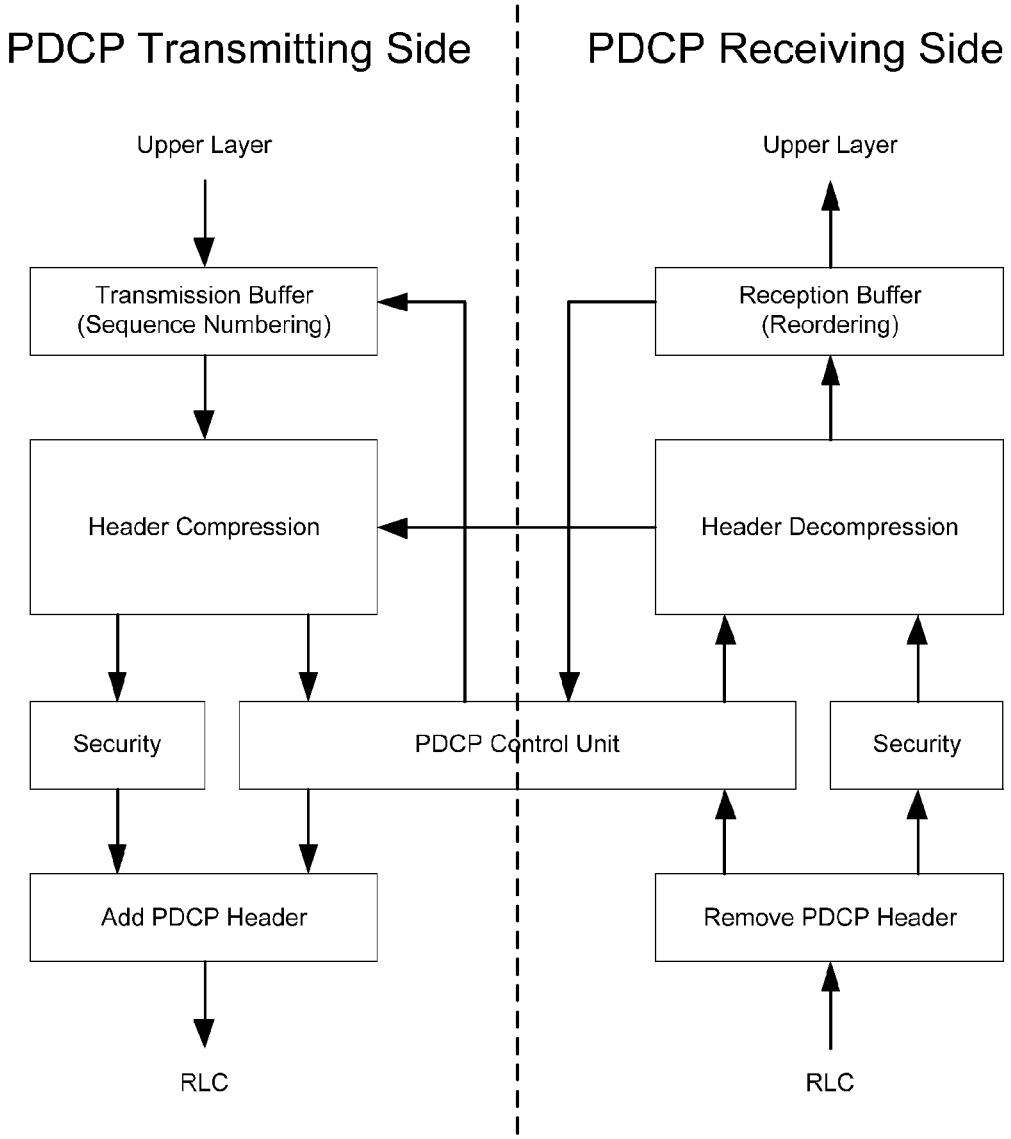
FIG. 4 is an exemplary structure of a PDCP entity to which the present invention is applied.

A detailed description of a PDCP entity will be given as following. In general, the PDCP entity is connected with a RRC layer or a user application in upward, and is connected with a RLC layer in downward. FIG. 4 is an exemplary structure of a PDCP entity to which the present invention is applied. As illustrated in FIG. 4, the PDCP entity is divided into a PDCP transmitting side and a PDCP receiving side. A PDCP entity in a transmitting side transmits service data units (SDUs) and protocol data unit (PDU) to a peer PDCP entity in a receiving side. A PDCP entity in the receiving side extracts a PDCP SDU or control information from the transmitted PDCP PDU. In general, a data PDU (PDCP data PDU) and a control PDU (PDCP control PDU) are generated by the PDCP entity in the transmitting side. The data PDU is a data block that is generated in the PDCP by processing the received SDU from an upper layer of the PDCP entity, and the control PDU is a data block that is generated in the PDCP for providing control information to a peer entity. The PDCP data PDU is generated in both user plane and control plane of a radio bearer (RB). Some functions of the PDCP are selectively applied for each of user and control plane. For example, a header compression function is only applied to data in the user plane, and an integrity protection function of a security function is only applied to data in the control plane. The security function also includes a ciphering function for data, and the ciphering function is applied to data in both user and control plane. The PDCP control PDU may be used to indicate a PDCP reception buffer status (i.e. a PDCP status report) and/or to indicate a status of header decompression (i.e., a header compression feedback packet).

The data processing procedure operated in a PDCP transmitting side will be given as following. First, the PDCP layer (or entity) stores a received PDCP SDU in a transmission buffer, and assigns a sequence number (SN) for each of PDCP SDU. (S1) If a setting radio bearer is a data radio bearer (DRB) (i.e., radio bearer of user plane), the PDCP layer performs a header compression with respect to the PDCP SDU. (S2) If a setting radio bearer is a signaling radio bearer (SRB) (i.e., radio bearer of control plane), the PDCP layer performs an integrity protection operation with respect to the PDCP SDU. (S3) After, with respect to a data block generated by a result of S2 or S3, the PDCP layer performs a ciphering. (S4) The PDCP generates a PDCP PDU by adding a header to the generated data block from S4, and then the PDCP deliver the generated PDCP PDU to a RLC layer.

The data processing procedure operated in a PDCP receiving side will be given as following. First, the PDCP layer (or entity) removes a header form the received PDCP PDU. (S1) Thereafter, the PDCP layer performs a deciphering with respect to the PDCP PDU without the header. (S2) If a setting radio bearer is a data radio bearer (DRB) (i.e., radio bearer of user plane), the PDCP layer performs a header decompression with respect to the deciphered PDCP PDU. (S3) If a setting radio bearer is a signaling radio bearer (SRB) (i.e., radio bearer of control plane), the PDCP layer performs an integrity protection operation with respect to the deciphered PDCP PDU. (S4) After the step of 3 or 4, the PDCP layer delivers the processed data blocks (i.e., PDCP SDUs) to an upper layer. (S5) If the setting radio bearer is a data radio bearer (DRB) used in a radio link control acknowledged mode (RLC AM), the processed data blocks may be stored in a reception buffer, and then may deliver to the upper layer after performing an reordering operation. (S6) Here, if the setting radio bearer is a data radio bearer (DRB) used in a radio link control acknowledged mode (RLC AM), the reordering operation must be performed because the DRB used in the RLC AM usually transmits an error sensitive data traffic. For this, a retransmission of data is performed to minimize data transmission errors during a wireless communication. The reordering operation is needed to deliver PDCP SDUs to the upper layer in-sequence order. In RLC AM, many different 'state variable' can be used to deliver the PDCP PDU to the upper layer in-sequence delivery.

First, the state variable can be defined as following.

RSN (Received Sequence Number): a sequence number (SN) of received PDCP SDU

LAST (Last submitted PDCP SDU SN): a sequence number of last delivered PDCP SDU among all delivered PDCP SDUs to the upper layer NEXT (Next expected PDCP SDU SN): a sequence number of a next PDCP SDU of a PDCP SDU having a highest SN among all received PDCP SDU (i.e., highest PDCP SDU SN+1)

Using the above state variable, when the PDCP entity in a receiving side receives a PDCP SDU, the PDCP entity may process a received PDCP SDU as following procedure. Here, for exemplary purpose only, it is assumed that all values are limited to a range of 0 to 4095 and a smallest value is a NEXT-2048.

First, if the PDCP entity receives a PDCP SDU having a sequence number that is smaller or less than a sequence number of PDCP SDU previously delivered to an upper layer, the received PDCP SDU is discarded because it is an outdated PDCP SDU. This procedure can be expressed in a procedure text as following.

```
if NEXT−2048<=RSN<=LAST
    decipher
    decompress
    discard
```

If the PDCP entity receives a PDCP SDU having a sequence number that is between a SN of last delivered PDCP SDU to the upper layer and a SN of a PDCP SDU having a highest SN, the received PDCP SDU is discarded if it is a duplicated PDCP SDU. If it is not a duplicated PDCP SDU, the received PDCP SDU is stored in a reception buffer. This procedure can be expressed in a procedure text as following.

```
if LAST<RSN<NEXT
    decipher
    decompress
    if not duplicate, store in the reception buffer
    if duplicate, discard
```

If the PDCP entity receives a PDCP SDU having a sequence number that is greater than or equal to a sequence number of PDCP SDU having a highest SN, the received PDCP SDU is stored in the reception buffer because it is a new PDCP SDU. Then, the NEXT is updated to RSN+1. This procedure can be expressed in a procedure text as following.

```
if NEXT<=RSN<NEXT+2048
    decipher
    decompress
    store in the reception buffer
    set NEXT to RSN+1
```

After processing and storing the received PDCP SDU using the above procedure, the PDCP entity (or layer) may deliver the stored PDCP SDU to an upper layer using a following procedure. The following procedure can be expressed in a procedure text as following.

```
if the PDCP SDU received by PDCP is not due to the RLC
    re-establishment:
    deliver to upper layer in ascending order of the asso-
        ciated SN value:
        all stored PDCP SDU(s) with an associated
            SN<RSN;
        all stored PDCP SDU(s) with consecutively associ-
            ated SN value(s)>=RSN;
```

set LAST to the SN of the last PDCP SDU delivered to upper layers.

Namely, the immediate delivery of PDCP SDUs to the upper layer is only performed when the reception of the PDCP SDUs is not due to the RLC re-establishment. However, the reordering operation must be performed for the received PDCP SDUs from the RLC re-establishment.

Figure 5:
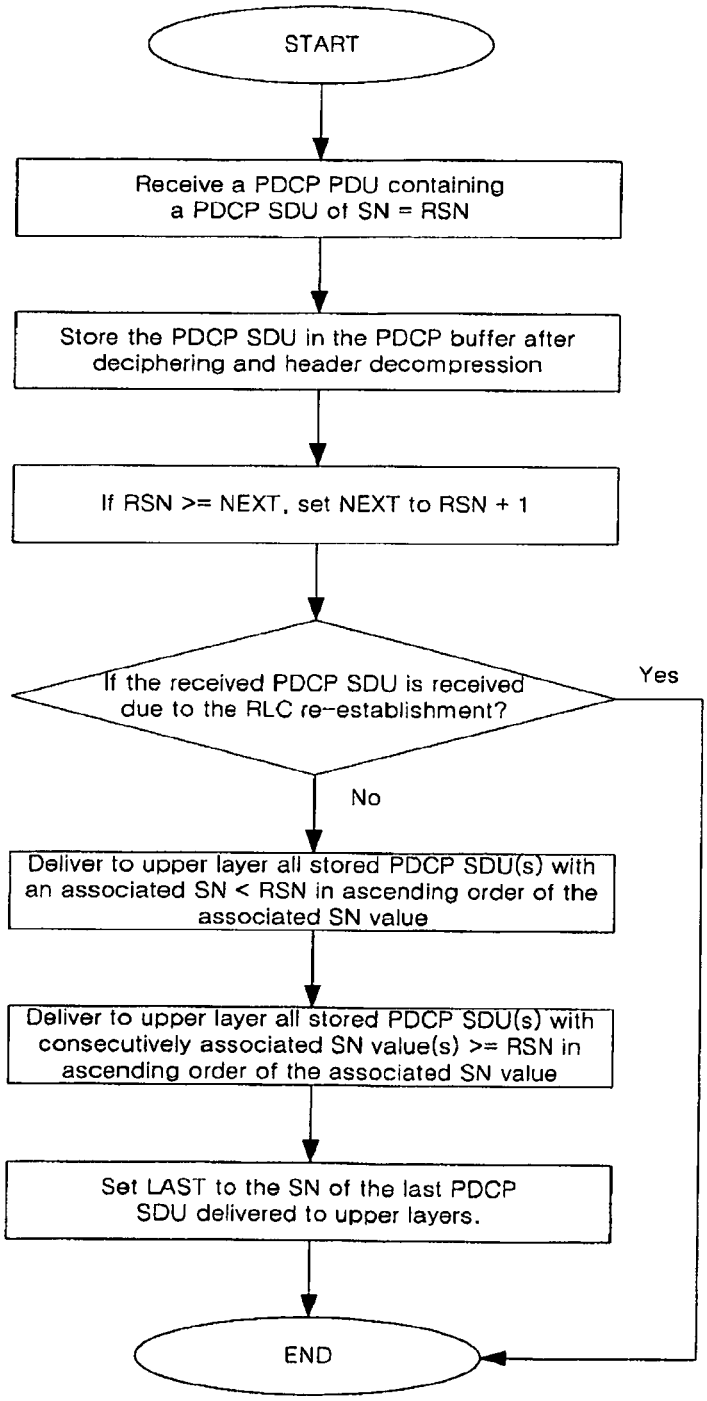
FIG. 5 is an exemplary data flow representing a delivery of PDCP data unit.

FIG. 5 is an exemplary data flow representing a delivery of PDCP data unit. As illustrated in FIG. 5, firstly, a PDCP PDU containing a PDCP SUD with a sequence number is received. Here, the sequence number may be defined as 'RSN'. Thereafter, an operation of a deciphering and a header decompression are performed, and then the deciphered and decompressed PDCP SDU is stored in a PDCP buffer. Then, the PDCP entity check whether a RSN is greater than or equal to a NEXT. If the RSN is greater than or equal to the NEXT, the NEXT is set to RSN+1. Then, the PDCP entity determines that the received PDCP SDU is received due to the RLC re-establishment. If it is determined that the received PDCP SDU is received due to the RLC re-establishment, the delivery procedure of the PDCP SDU is terminated. If not, the PDCP entity delivers to upper layer all stored PDCP SDU(s) with an associated SN<RSN in ascending order of the associated SN value. Further, the PDCP entity also delivers to upper layer all stored PDCP SDU(s) with consecutively associated SN value(s)>=RSN in ascending order of the associated SN value. Thereafter, the PDCP sets LAST to the SN of the last PDCP SDU delivered to the upper layer, and terminates the PDCP SDU delivery procedure.

Figure 6:
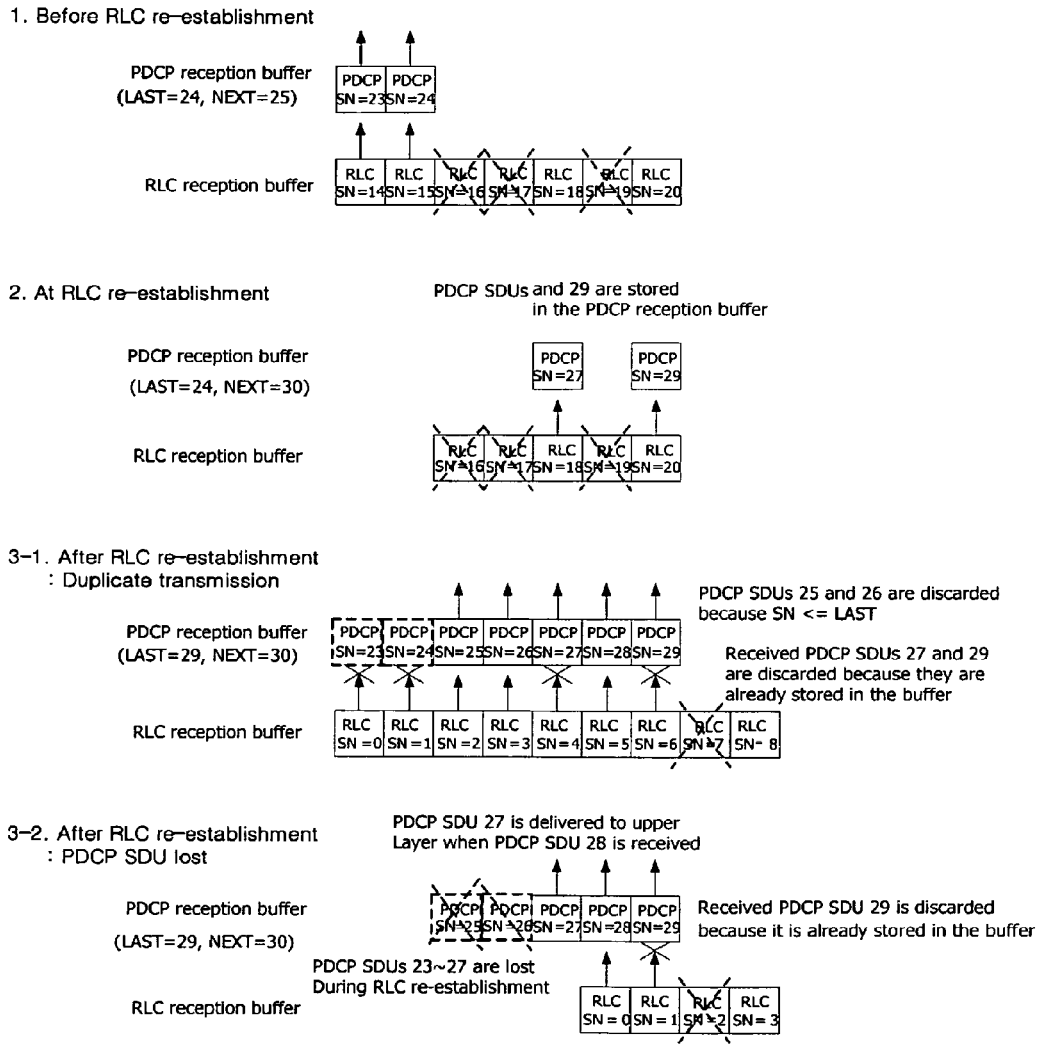
FIG. 6 is an exemplary data flow representing a reordering and a delivery of PDCP data unit.

FIG. 6 is an exemplary data flow representing a reordering and a delivery of PDCP data unit. In order to provide simple explanation, in FIG. 6, a PDCP control PDU is not considered, and there is assumption that a single PDCP PDU is included in a single RLC PDU and the PDCP PDU includes a single PDCP SDU.

First, a RLC entity in a receiving side consecutively (in-sequence) receives a RLC PDU up to RLC PDU=13, then delivers them to a PDCP entity in the receiving side. When the RLC PDUs are delivered to the PDCP entity, the receiving RLC entity notifies a RLC entity in a transmitting side about successful reception of RLC PDUs up to RLC PDU=13 through a RLC status report. A receiving PDCP entity may delivery to an upper layer all PDCP SDU(s) up to PCDP SDU=22, as they were received in-sequence order. Here, a transmitting PDCP entity may be notified or acknowledged that a successful reception of PDCP SDUs up to PDCP SDU=22 through the RLC status report.

As illustrated in FIG. 6, before the RCL re-establishment, the transmitting RLC entity transmits the RLC PDU=14 to RLC PDU=20, but RLC PDU=16, 17, 19 fails to be transmitted. As such, the receiving RLC entity delivers to a PDCP entity of upper layer the in-sequence received RLC SN up to RLC SN=15, and the PDCP entity also delivers to its upper layer the in-sequence received PDCP SDU up to PDCP SN=24. At this time, the LAST is equal to 24, and the NEXT is equal to 25. The RLC PDU=18 and RLC PDU=20 is successfully received, but these RLC PDUs are stored in the reception buffer as some of previous RLC PDUs are not successfully received. At this time, the receiving RLC entity has to notify this to the transmitting RLC entity through the RLC status report, but the RLC re-establishment is happen before the transmission of the RLC status report. (S1)

If the RLC re-establishment is happen due to a handover, those RLC PDU, which have been successfully received but stored in the buffer because some of previous RLC PDUs are not received successfully, deliver to an upper layer of the PDCP entity. In case of the FIG. 6, the RLC PDU=18 and RLC PDU=20 are applied in this situation, thusly the RLC PDU=18 and RLC PDU=20 are delivered to the upper layer accordingly. The PDCP entity stores a received PDCP SDU due to the RLC re-establishment in the PDCP reception buffer. As such, the PDCP SDU=27 and PDCP SDU=29 are stored in the PDCP reception buffer. As the transmitting PDCP entity determines a successful PDCP SDU transmission result based on a most recent RLC status report, the transmitting PDCP entity concludes that the PDCP SDUs up to PDCP SDU=22 are successfully transmitted and the PDCP SDUs between PDCP SDU=23 and PDCP SDU=29 are not successfully transmitted. (S2)

After the RLC re-establishment, the RLC entity initializes or resets all state variables, and restarts a data transmission. The transmitting PDCP entity may retransmit those PDCP SDUs that were not successfully transmitted to the receiving PDCP entity before the RLC re-establishment. Here, some of the PDCP SDUs may be lost, and the transmitting PDCP entity may only retransmit transmittable PDCP SDUs in-sequence order. The transmitting PDCP entity retransmits those PDCP SDUs, which were not successfully transmitted before the RLC re-establishment, based on the most latest RLC status report. In case of the FIG. 6, the transmitting PDCP entity retransmits the PDCP SDUs (PDCP SDU=23 to PDCP SDU=29). These PDCP SDUs are transmitted through RLC PDUs=0 to RLC PDUs=6. When these RLC PDUs (0-6) are received by the receiving RLC entity, these RLC PDUs are delivered to the receiving PDCP entity in-sequence order. If these RLC PDUs are received by the receiving PDCP entity, the PDCP SDU≤23 and 24 are discarded because the SN of theses PDCP SDU are less than the LAST, and the PDCP SDU≤27 and 29 are also discarded because these PDCP SDUs are already stored. The receiving PDCP entity delivers to the upper layer from PDCP SDUs=25 to PDCP SDUs=29 in-sequence order. After delivering of the transmittable PDCP SDUs, the state variables of LAST and NEXT are updated as LAST=29 and NEXT=30. (S3-1)

During the Handover, a source eNB may forward those unsuccessfully transmitted PDCP SDUs to a target eNB. However, there is possibility of data loss at an interface between networks. In case of the FIG. 6, the PDCP SDUs (PDCP SDU=23 to PDCP SDU=29) were forwarded from the source eNB to the target eNB, but the PDCP SDUs from PDCP SDU=23 to PDCP SDU=27 are lost during the RLC re-establishment. The transmitting PDPC entity transmits the PDCP SDUs in ascending order (from PDCP SDU=28 to PDCP SDU=31) by including theses SDUs in the RLC PDUs (RLC PDU=0 to RLC PDU=3). If these RLC PDUs are received by the receiving PDCP entity, these RLC PDUs are delivered to the receiving PDCP entity in-sequence order. If these RLC PDUs are received by the receiving PDCP entity, the PDCP SDU=23 and 24 are discarded because the SN of theses PDCP SDU are less than the LAST, and the PDCP SDU=27 and 29 are also discarded because these PDCP SDUs are already stored. The receiving PDCP entity delivers to the upper layer from PDCP SDUs=25 to PDCP SDUs=29 in-sequence order. If the receiving PDCP receives PDCP SDU=28 included in RLC PDU=0, the PDCP SDU=27 having smaller SN is delivered to the upper layer. Also, the PDCP SDU=28 and its consecutive PDCP SDU=29 also are delivered to the upper layer. After delivering of the transmittable PDCP SDUs, the state variables of LAST and NEXT are updated as LAST=29 and NEXT=30. (S3-2)

Figure 7:
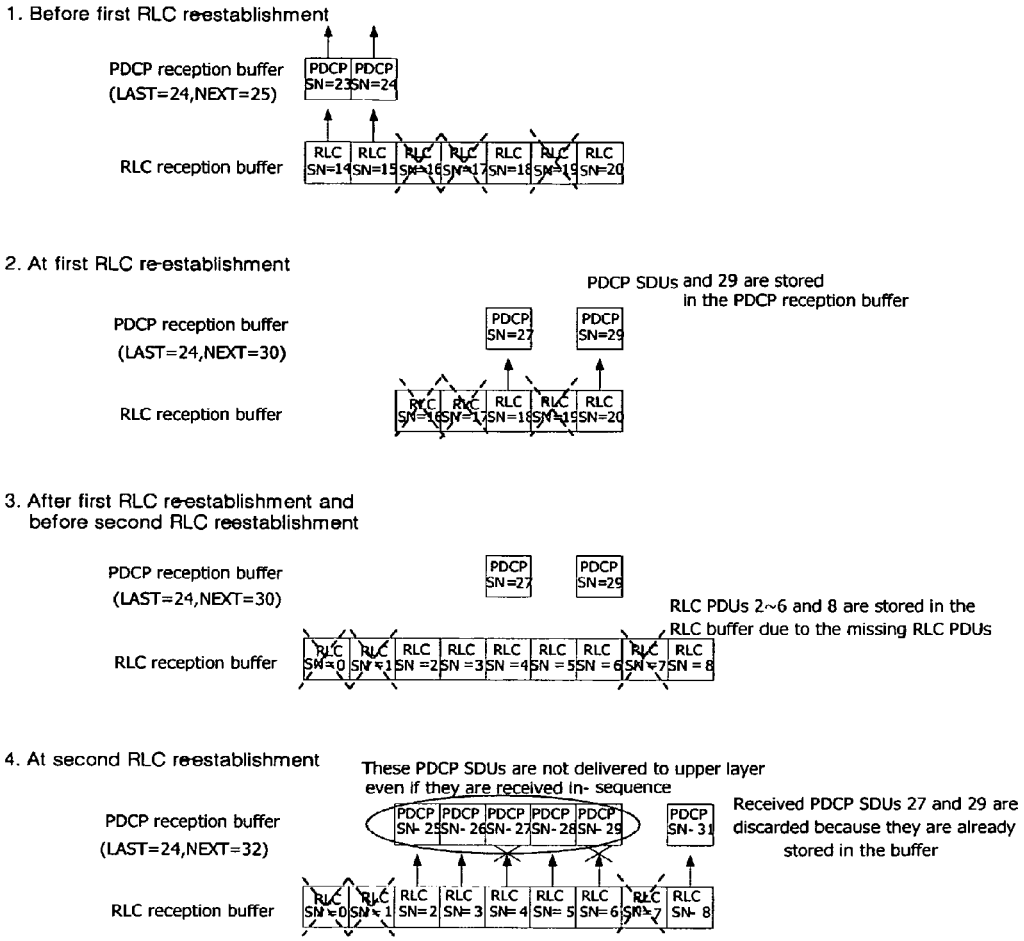
FIG. 7 is an another exemplary data flow representing a reordering and a delivery of PDCP data unit.

FIG. 7 is an another exemplary data flow representing a reordering and a delivery of PDCP data unit;

First, a RLC entity in a receiving side consecutively (in-sequence) receives a RLC PDU up to RLC PDU=13, then delivers them to a PDCP entity in the receiving side. When the RLC PDUs are delivered to the PDCP entity, the receiving RLC entity notifies a RLC entity in a transmitting side about successful reception of RLC PDUs up to RLC PDU=13 through a RLC status report. A receiving PDCP entity may delivery to an upper layer all PDCP SDU(s) up to PCDP SDU=22, as they were received in-sequence order. Here, a transmitting PDCP entity may be notified or acknowledged that a successful reception of PDCP SDUs up to PDCP SDU=22 through the RLC status report.

As illustrated in FIG. 7, before the RCL re-establishment, the transmitting RLC entity transmits the RLC PDU=14 to RLC PDU=20, but RLC PDU=16, 17, 19 fails to be transmitted. As such, the receiving RLC entity delivers to a PDCP entity of upper layer the in-sequence received RLC SN up to RLC SN=15, and the PDCP entity also delivers to its upper layer the in-sequence received PDCP SDU up to PDCP SN=24. At this time, the LAST is equal to 24, and the NEXT is equal to 25. The RLC PDU=18 and RLC PDU=20 is successfully received, but these RLC PDUs are stored in the reception buffer as some of previous RLC PDUs are not successfully received. At this time, the receiving RLC entity has to notify this to the transmitting RLC entity through the RLC status report, but the RLC re-establishment is happen before the transmission of the RLC status report. (S1)

If the RLC re-establishment is happen due to a handover, those RLC PDU, which have been successfully received but stored in the buffer because some of previous RLC PDUs are not received successfully, deliver to an upper layer of the PDCP entity. In case of the FIG. 7, the RLC PDU=18 and RLC PDU=20 are applied in this situation, thusly the RLC PDU=18 and RLC PDU=20 are delivered to the upper layer accordingly. The PDCP entity stores a received PDCP SDU due to the RLC re-establishment in the PDCP reception buffer. As such, the PDCP SDU=27 and PDCP SDU=29 are stored in the PDCP reception buffer. As the transmitting PDCP entity determines a successful PDCP SDU transmission result based on a most recent RLC status report, the transmitting PDCP entity concludes that the PDCP SDUs up to PDCP SDU=22 are successfully transmitted and the PDCP SDUs between PDCP SDU=23 and PDCP SDU=29 are not successfully transmitted. (S2)

After a first RLC re-establishment and before a second RLC re-establishment, the RLC PDUs (RLC PDUs=2-6 and 8) are stored in the RLC buffer due to missing RLC PDUs (S3)

At the second RLC re-establishment, the receiving PDCP entity may receive all missing PDCP SDUs (PDCP SDUs 25-29). However, these PDCP SDUs are not delivered to upper layer even if they are received in-sequence order, as illustrated in FIG. 7. (S4)

As explained above, an object of the present invention is to minimize a time delay of data transmission, to prevent a waste of radio resources during the data transmission, and/or to prevent a deadlock situation during a delivery of PDCP SDUs to an upper layer.

For this, the present invention proposes to use following procedure text for delivering a continuously and/or consecutively received PDCP SDUs to the upper layer immediately if a PDCP entity receives the PDCP SDUs from a RLC entity through a RLC re-establishment.

if RSN=LAST+1:
  deliver to upper layer in ascending order of the associated SN value:
    all stored PDCP SDU(s) with consecutively associated SN value(s)>=RSN;
  set LAST to the SN of the last PDCP SDU delivered to upper layers;
else if the PDCP SDU received by PDCP is not due to the RLC re-establishment:
  deliver to upper layer in ascending order of the associated SN value:
    all stored PDCP SDU(s) with an associated SN<RSN;
    all stored PDCP SDU(s) with consecutively associated SN value(s)>=RSN;
  set LAST to the SN of the last PDCP SDU delivered to upper layers.

According to the above procedure text, when a PDCP SDU is received through a RLC re-establishment, the present disclosure proposes to determine whether a sequence number (SN) of received PDCP SDU is equal to LAST+1. Upon the determination, if the sequence number of received PDCP SDU is determined to be LAST+1, the received PDCP SDU and any PDCP SDUs having a consecutively in-sequence sequence number after the sequence number of the received PDCP SDU, should immediately deliver to an upper layer in-sequence order rather than storing these into a reception buffer.

Figure 8:
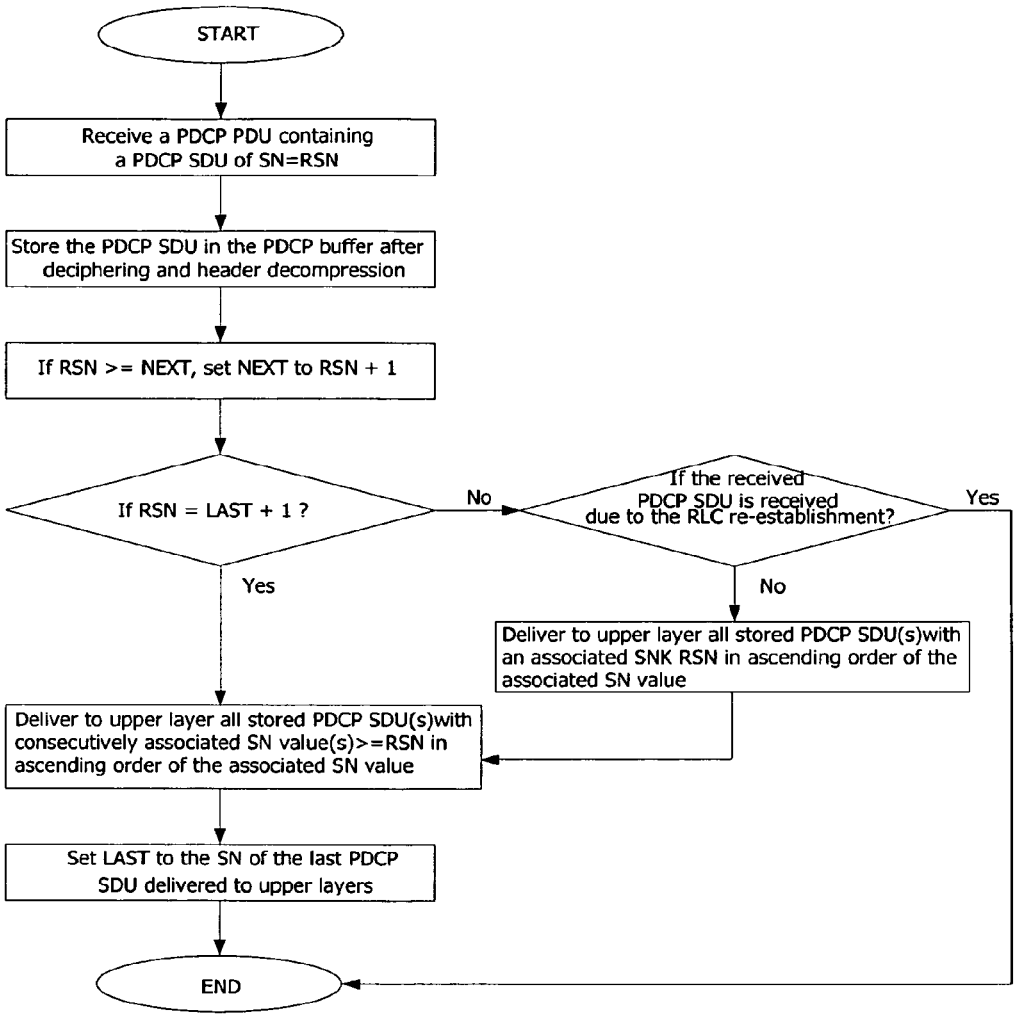
FIG. 8 is a first exemplary data flow representing a delivery of PDCP data unit according to the present invention.

FIG. 8 is a first exemplary data flow representing a delivery of PDCP data unit according to the present invention.

As illustrated in FIG. 8, firstly, a PDCP PDU containing a PDCP SUD with a sequence number is received. Here, the sequence number may be defined as 'RSN'. Thereafter, an operation of a deciphering and a header decompression are performed, and then the deciphered and decompressed PDCP SDU is stored in a PDCP buffer. Then, the PDCP entity check whether a RSN is greater than or equal to a NEXT. If the RSN is greater than or equal to the NEXT, the NEXT is set to RSN+1. Thereafter, it is determined that whether the sequence number of received PDCP SDU (i.e., RSN) is equal to LAST+1. Upon the determination, If the RSN is equal to LAST+1, the received PDCP SDU and any PDCP SDUs having a consecutively in-sequence sequence number after the sequence number of the received PDCP SDU (i.e., all PDCP SDUs with consecutively associated SN values>=RSN) are delivered to the upper layer. Thereafter, the PDCP entity sets LAST to the SN of the last PDCP SDU delivered to the upper layer, and terminates the PDCP SDU delivery procedure. On the other hand, upon the determination, if the RSN is not equal to LAST+1, then, the PDCP entity determines whether the received PDCP SDU is received due to the RLC re-establishment. If it is determined that the received PDCP SDU is received due to the RLC re-establishment, the delivery procedure of the PDCP SDU is terminated. If not, the PDCP entity delivers to upper layer all stored PDCP SDU(s) with an associated SN<RSN in ascending order of the associated SN value. Further, the PDCP entity also delivers to upper layer all stored PDCP SDU(s) with consecutively associated SN value(s)>=RSN in ascending order of the associated SN value. Thereafter, the PDCP sets LAST to the SN of the last PDCP SDU delivered to the upper layer, and terminates the PDCP SDU delivery procedure.

Figure 9:
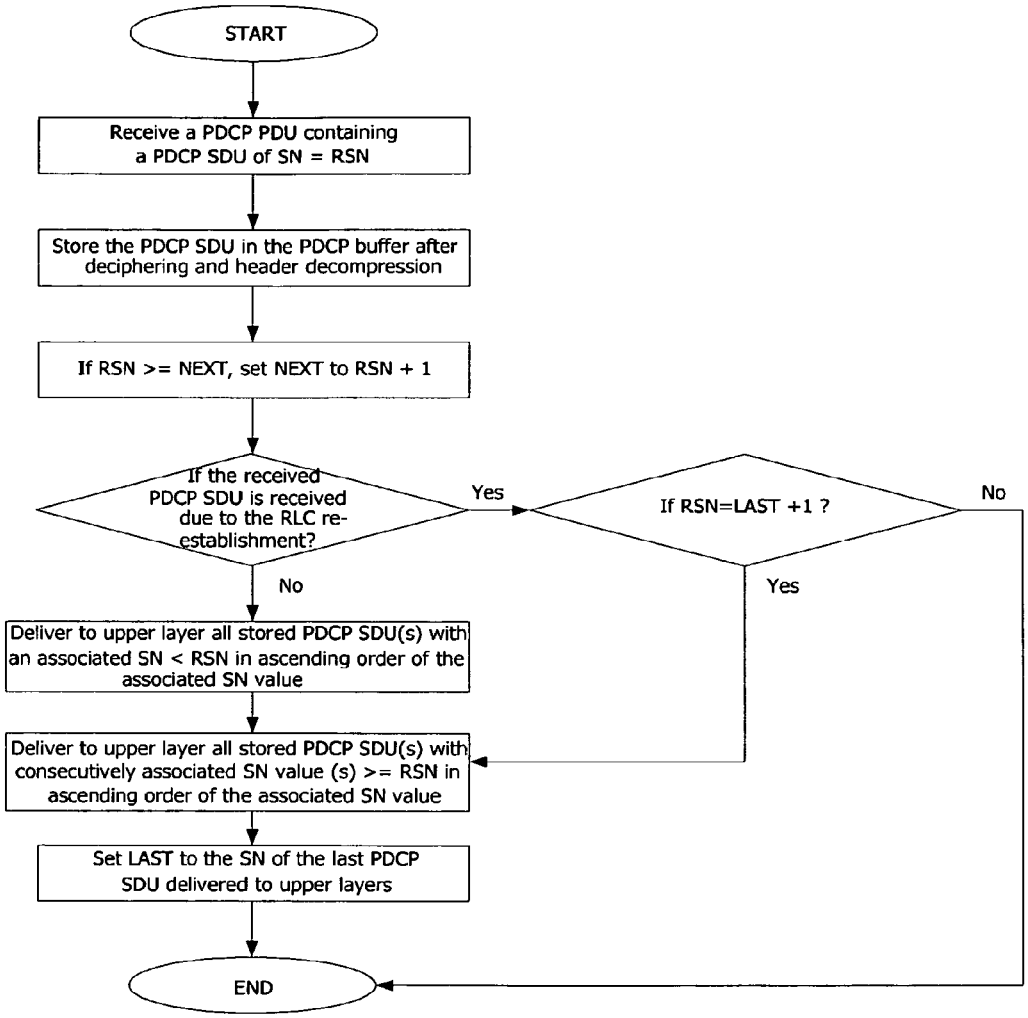
FIG. 9 is a second exemplary data flow representing a delivery of PDCP data unit according to the present invention.

Here, a step of determining whether the sequence number of the received PDCP SDU is equal to the LAST+1 and a step of determining whether the received PDCP SDU is received due to the RLC re-establishment, are mutually exclusive steps. As such, these two determining steps may be in switched order. Therefore, the following procedure text is also possible according to the present disclosure.

if the PDCP SDU received by PDCP is not due to the RLC re-establishment:
- deliver to upper layer in ascending order of the associated SN value:
  - all stored PDCP SDU(s) with an associated SN<RSN;
  - all stored PDCP SDU(s) with consecutively associated SN value(s)>=RSN;
- set LAST to the SN of the last PDCP SDU delivered to upper layers.

else if RSN=LAST+1:
- deliver to upper layer in ascending order of the associated SN value:
  - all stored PDCP SDU(s) with consecutively associated SN value(s)>=RSN;
- set LAST to the SN of the last PDCP SDU delivered to upper layers;

FIG. 9 is a second exemplary data flow representing a delivery of PDCP data unit according to the present invention.

As illustrated in FIG. 9, a PDCP PDU containing a PDCP SUD with a sequence number is received. Here, the sequence number may be defined as 'RSN'. Thereafter, an operation of a deciphering and a header decompression are performed, and then the deciphered and decompressed PDCP SDU is stored in a PDCP buffer. Then, the PDCP entity check whether a RSN is greater than or equal to a NEXT. If the RSN is greater than or equal to the NEXT, the NEXT is set to RSN+1. Thereafter, it is determined that whether the received PDCP SDU is received due to the RLC re-establishment. If it is determined that the received PDCP SDU is received due to the RLC re-establishment, the PDCP entity determines whether the sequence number of received PDCP SDU (i.e., RSN) is equal to LAST+1. Upon the determination, If the RSN is equal to LAST+1, the received PDCP SDU and any PDCP SDUs having a consecutively in-sequence sequence number after the sequence number of the received PDCP SDU (i.e., all PDCP SDUs with consecutively associated SN values>=RSN) are delivered to the upper layer. Thereafter, the PDCP entity sets LAST to the SN of the last PDCP SDU delivered to the upper layer, and terminates the PDCP SDU delivery procedure. On the other hand, if the RSN is not equal to LAST+1, the delivery procedure of PDCP SDUs is immediately terminated. If it is determined that the received PDCP SDU is not received due to the RLC re-establishment, the PDCP entity delivers to upper layer all stored PDCP SDU(s) with an associated SN<RSN in ascending order of the associated SN value. Further, the PDCP entity also delivers to upper layer all stored PDCP SDU(s) with consecutively associated SN value(s)>=RSN in ascending order of the associated SN value. Thereafter, the PDCP sets LAST to the SN of the last PDCP SDU delivered to the upper layer, and terminates the PDCP SDU delivery procedure.

The COUNT format including the PDCP SN (Sequence Number) referred in the present disclosure may also be applied to the present invention. Here, the COUNT value is composed of a HFN (Hyper Frame Number) and the PDCP SN. The length of the PDCP SN may set by an upper layer. The COUNT value may be used instead of the PDCP SN, in order to solve a wrap around problem that can be caused during any operation mentioned in the present disclosure.

The present disclosure may provide a data communication method in a wireless communication system, the method comprising: receiving, from a lower layer, a data unit having a sequence number; storing the received data unit in a buffer; determining whether the sequence number of the received data unit is equal to a sequence number+1 from a sequence number of a last delivered data unit; delivering, in ascending order, all stored data units with consecutively associated sequence numbers greater than or equal to the sequence number of the received data unit based on the determining step, and setting a sequence number of a last data unit delivered to an upper layer as a 'LAST', wherein the lower layer is a Radio Link Control (RLC) layer, the steps of determining and delivering are performed in a Packet Data Convergence Protocol (PDCP) entity, the data unit is a PDCP Service Data Unit (SDU), the data unit is received through a RLC re-establishment, a header decompression or a deciphering is performed between the receiving step and the storing step, the sequence number+1 indicates a sequence number that is immediately subsequent to the sequence number of the last delivered data unit, and the sequence number+1 indicates a next sequence number from the sequence number of the last delivered data unit.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A data communication method in a wireless communication system, the method comprising:

receiving, from a lower layer, a data unit having a sequence number;

*determining whether the sequence number of the received data unit is equal to a last submitted PDCP (Packet Data Convergence Protocol) sequence number+1, and whether the received data unit is received due to a RLC (Radio Link Control) re-establishment;*

*if the received data unit is not due to the RLC re-establishment, submitting to an upper layer in ascending order of an associated count value, all stored data units with an associated count value less than the count value associated with the received data unit and all stored data units with consecutively associated count values starting from the count value associated with the received data unit, and setting the last submitted PDCP sequence number equal to the sequence number of the last data unit submitted to the upper layer; and* if the received data unit is [received] due to [a] *the* RLC (Radio Link Control) re-establishment[, determining whether] *and when* the sequence number of the received data unit is equal to [a] *the* last submitted PDCP (Packet Data Convergence Protocol) sequence number+1[;], submitting, to [an] *the* upper layer, in ascending order, [the received data unit and any additional data units received from the lower layer having sequence numbers consecutively associated with the sequence number of the received data unit] *all stored data units with consecutively associated count values*; and setting the last submitted PDCP sequence number equal to the sequence number of the last data unit submitted to the upper layer.

2. The method of claim 1, wherein the lower layer is a Radio Link Control (RLC) layer.

3. The method of claim 1, wherein the steps of determining and [delivering] *submitting* are performed in a PDCP entity.

4. The method of claim 1, wherein the data units are PDCP Service Data Units (SDUs).

5. The method of claim 1, wherein header decompression or deciphering is performed on the received data unit.

6. The method of claim 1, wherein the last submitted PDCP sequence number+1 indicates a sequence number that immediately follows the sequence number of the data unit that was last submitted to the upper layer.

7. The method of claim 1 further comprising:

storing the received data units; and submitting, to the upper layer, in ascending order, all stored data units having of an associated count value.

8. The method of claim 7, wherein the associated count value starts from a count value associated with the received data unit.

9. An apparatus, comprising:

*a processor; and*

*memory, the memory having instructions stored therein which are accessed and executed by the processor to implement* a radio protocol layer adapted to receive a data unit having a sequence number from a lower layer, to determine whether the sequence number of the received data unit is equal to a last submitted PDCP (Packet Data Convergence Protocol) sequence number+1*, and whether the received data unit is received due to a RLC (Radio Link Control) re-establishment,*

*if the received data unit is not due to the RLC re-establishment, to submit to an upper layer in ascending order of an associated count value, all stored data units with an associated count value less than the count value associated with the received data unit and all stored data units with consecutively associated count value starting from the count value associated with the received data unit, and to set the last submitted PDCP sequence number equal to the sequence number of the last data unit submitted to the upper layer, and* if the received data unit is [received] due to [a] *the* RLC (Radio Link Control) re-establishment *and when the sequence number of the received data unit is equal to the last submitted PDCP (Packet Data Convergence Protocol) sequence number+1*, [to submit] *in ascending order, all stored data units with consecutively associated values*, to [an] *the* upper layer[, in ascending order, the received data unit and any additional data units received from the lower layer having sequence numbers consecutively associated with the sequence number of the received data unit,] and to set the last submitted PDCP sequence number equal to the sequence number of the last data unit submitted to the upper layer.

10. The apparatus of claim 9, wherein the lower layer is a Radio Link Control (RLC) layer.

11. The apparatus of claim 9, wherein the data units are PDCP Service Data Units (SDUs).

12. The apparatus of claim 9, wherein the last submitted PDCP sequence number+1 indicates a sequence number that immediately follows the sequence number of the data unit that was last submitted to the upper layer.

13. The apparatus of claim 9, wherein the radio protocol layer is further adapted to store received data units and submit to the upper layer, in ascending order, all stored data units having an associated count value.

14. The apparatus of claim 13, wherein the associated count value starts from a count value associated with the received data unit.

* * * * *